United States Patent
Hornback, Jr. et al.

(10) Patent No.: US 9,313,273 B2
(45) Date of Patent: Apr. 12, 2016

(54) PULL-CONFIGURED DISTRIBUTION OF IMAGERY

(71) Applicants: Raymond Hornback, Jr., Lexington, KY (US); James S. Johnston, Lexington, KY (US); Mark S. Kressin, Lakeway, TX (US); Matthew A. Levy, Fairfax, VA (US); Andrew M. Ortwein, Lexington, KY (US); William M. Quinn, Lexington, KY (US); Kevin Solie, Lexington, KY (US)

(72) Inventors: Raymond Hornback, Jr., Lexington, KY (US); James S. Johnston, Lexington, KY (US); Mark S. Kressin, Lakeway, TX (US); Matthew A. Levy, Fairfax, VA (US); Andrew M. Ortwein, Lexington, KY (US); William M. Quinn, Lexington, KY (US); Kevin Solie, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/941,223

(22) Filed: Jul. 12, 2013

(65) Prior Publication Data

US 2014/0025784 A1 Jan. 23, 2014

Related U.S. Application Data

(63) Continuation of application No. 10/745,091, filed on Dec. 22, 2003, now Pat. No. 8,521,830.

(51) Int. Cl.
*G06F 15/16* (2006.01)
*H04L 29/08* (2006.01)
*H04L 12/18* (2006.01)
*H04L 29/06* (2006.01)
*H04N 21/222* (2011.01)
*H04N 21/231* (2011.01)

(52) U.S. Cl.
CPC ........ *H04L 67/1097* (2013.01); *H04L 12/1827* (2013.01); *H04L 29/06* (2013.01); *H04L 29/06027* (2013.01); *H04L 65/4038* (2013.01); *H04L 67/02* (2013.01); *H04L 67/26* (2013.01); *H04L 67/2852* (2013.01); *H04N 21/222* (2013.01); *H04N 21/23106* (2013.01); *H04L 69/329* (2013.01)

(58) Field of Classification Search
CPC ...................................................... H04L 29/08
USPC ........................................................ 709/219
See application file for complete search history.

(56) References Cited

U.S. PATENT DOCUMENTS

| | | | |
|---|---|---|---|
| 6,269,080 B1* | 7/2001 | Kumar | 370/236 |
| 6,343,313 B1* | 1/2002 | Salesky | G06F 3/1415 709/203 |
| 6,584,493 B1* | 6/2003 | Butler | 709/204 |
| 6,601,087 B1* | 7/2003 | Zhu et al. | 709/205 |
| 6,633,688 B1* | 10/2003 | Nixon et al. | 382/305 |
| 7,197,535 B2* | 3/2007 | Salesky | G06F 3/1415 379/202.01 |
| 8,255,461 B1* | 8/2012 | Liu et al. | 709/204 |

(Continued)

*Primary Examiner* — Guang Li
(74) *Attorney, Agent, or Firm* — Steven M. Greenberg, Esq.; CRGO Law

(57) ABSTRACT

The present invention is a method, system and apparatus for flexible image sharing. In a system for flexibly distributing imagery in an image sharing session, an image cache can be disposed between an application sharing host and a plurality of application sharing viewers. Additionally, a multipoint communications server can be disposed between the image cache and the application sharing viewers and can be communicatively linked to the application sharing host. Importantly, a pull-based subscription model can be implemented in an image cache server hosting the image cache. In particular, the model can have a configuration for registering respective ones of the application sharing viewers to receive notifications of available updated imagery.

10 Claims, 2 Drawing Sheets

(56) References Cited

U.S. PATENT DOCUMENTS

2003/0063770 A1* 4/2003 Svendsen et al. ............ 382/100
2003/0110218 A1* 6/2003 Stanley ............... H04L 12/1813
    709/204
2004/0080504 A1* 4/2004 Salesky et al. ............... 345/418
2008/0059583 A1* 3/2008 Mao .................... H04L 12/1813
    709/205

* cited by examiner

PULL-CONFIGURED DISTRIBUTION OF IMAGERY

CROSS-REFERENCE TO RELATED APPLICATIONS

This application is a continuation of U.S. patent application Ser. No. 10/745,091, currently pending, filed Dec. 22, 2003, the entirety of which are incorporated herein by reference.

BACKGROUND OF THE INVENTION

1. Statement of the Technical Field

The present invention relates to the field of image distribution and more particularly to the distribution of application imagery during an application sharing session between a multiplicity of application viewers.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include instant messaging, Internet telephony and application sharing.

In conventional application sharing, an application host can distribute imagery of an application operating in the host to one or more application viewers distributed about the computer communications network. The imagery can include not only the screens rendered in association with the operation of the shared application, but also the visual presentation of mouse pointer movements and the like. Generally, speaking, however, the imagery can include only discrete "snap-shots" of the actual display of the operating application in the host system. In this way, the application viewers can be given the appearance of sharing an application, though each viewer merely views a shadow rendering of only a portion of the operation of the shared application.

As it will be apparent to the skilled artisan, the transmission of imagery across the computer communications network to a multiplicity of viewers can produce substantial problems which relate not only to the timing of delivery of the distributed image frames to the viewing population, but also in delivering the imagery to multiple disparate viewing clients. In this regard, while some viewing clients may enjoy substantial communications bandwidth and access to vast processing resources, other viewing clients may suffer from limited bandwidth and inferior processing resources. Accordingly, accommodating "slower" viewing clients without affecting the viewing experience of "faster" viewing clients can be challenging if not impossible.

The problem of accommodating multiple, disparate viewing clients can be exacerbated when considering that not all viewing clients begin a viewing session simultaneously. More particularly, in the prototypical circumstance, the delivery of viewing frames of a shared application can be synchronized so that all viewing clients view the application in the same state at the same time. Synchronization can be particularly important when supporting a collaborative effort such as an e-meeting where all participants presume that the shared application appears identically for all e-meeting participants.

Just as in the case of a human-to-human meeting, however, in the world of the e-community, some meeting participants fail to "arrive" at an e-meeting in a timely manner. Where multiple participants engage in the e-meeting, however, it may not be feasible to await the arrival of a "late joiner". In this case, the e-meeting must commence in the absence of the late joiner. When the late joiner does finally "arrive" for the e-meeting, the distribution of further imagery relating to a shared application must halt pending the synchronization of the view of the application with the display of the late joiner. Accordingly, accommodating the late joiner can produce an unwanted delay in the distribution of additional updated frames to the existing meeting participants.

SUMMARY OF THE INVENTION

The present invention addresses the deficiencies of the art in respect to distributing application imagery in an application sharing session and provides a novel and non-obvious method, system and apparatus for flexible application sharing. In a system for flexibly distributing imagery in an application sharing session, an image cache can be disposed between an application sharing host and a plurality of application sharing viewers. Additionally, a multipoint communications server can be disposed between the image cache and the application sharing viewers and can be communicatively linked to the application sharing host. Importantly, a pull-based subscription model can be implemented in an image cache server hosting the image cache. In particular, the model can have a configuration for registering respective ones of the application sharing viewers to receive notifications of available updated imagery for a shared application.

In a method for flexibly distributing imagery for a shared application in an application sharing session, an image frame update can be cached for a shared application. Registered ones of a plurality of application sharing viewers can be notified of the image frame update. Consequently, the cached image frame update can be served to requesting ones of the application sharing viewers. In a preferred aspect of the invention, the cached image frame update can be partitioned into multiple sub-sections and the multiple sub-sections can be cached. As a result, the serving step also can include comparing an already served image frame in the requesting ones of the application sharing viewers to the cached image frame update. As a result, only changed ones of the multiple sub-sections can be served to the requesting ones of the application sharing viewers.

In another preferred aspect of the invention, the serving step can include detecting a slow one of the application sharing viewers, and serving a newer image frame to the slow one of the application sharing viewers responsive to a request by the slow one of the application sharing viewers for an older image frame. Similarly, in yet another preferred aspect of the invention, the serving step can include detecting a late joining one of the application sharing viewers, and serving a pre-defined layout of the shared application to the late joining one of the application sharing viewers in order to facilitate a sequential retrieval by the late joining one of the application sharing viewers of already distributed image frames for the shared application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is system, method and apparatus for the flexible distribution of imagery in an application sharing session. In accordance with the present invention, an image cache can be disposed between an application sharing host and a multiplicity of application sharing viewers. Images from a shared application can be pushed to the cache at a rate preferred by the application sharing host. By comparison, the cached images can be pulled from the cache by individual ones of the application sharing viewers at a rate preferred by the individual application sharing viewers. In this way, the characteristics of operation of each individual application sharing viewer cannot affect the application sharing process experienced by others of the individual application sharing viewers.

Figure 1:
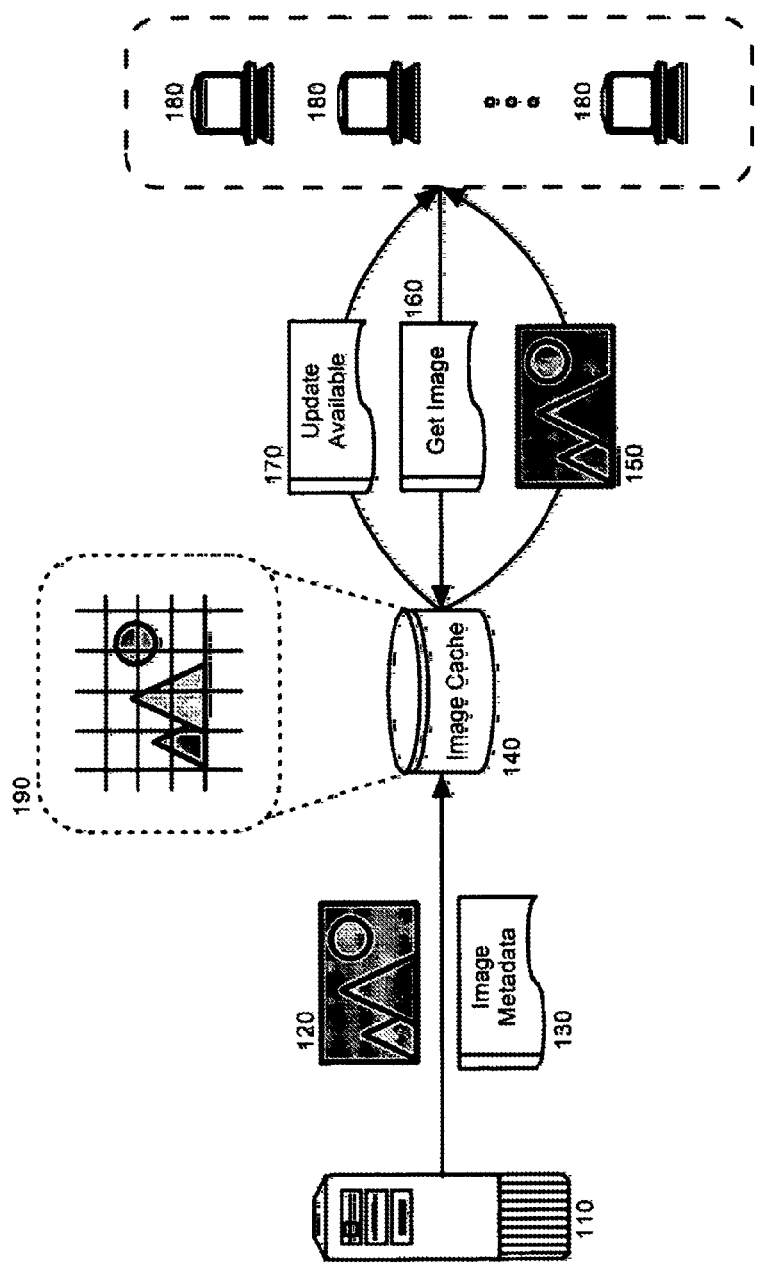
FIG. 1 is pictorial illustration of a system, method and apparatus for distributing application imagery during an application sharing session in accordance with the present invention; and, FIG. 2 is a timing diagram illustrating a process for distributing application imagery during an application sharing session in accordance with the present invention.

In further illustration of the specific preferred aspects of the present invention, FIG. 1 is pictorial illustration of a system, method and apparatus for distributing application imagery during an application sharing session. In accordance with the present invention, an application sharing host 110 can serve imagery 120 of a shared application along with image metadata 130 with individual ones of application sharing viewers 180. Unlike conventional application sharing arrangements, however, in the present invention an image cache 140 can be disposed in between the application sharing host 110 and the application sharing viewers 180.

More particularly, the image cache 140 can push imagery 120 and image metadata 130 regarding the pushed imagery 120 to the image cache 140 at a rate pre-specified by one of the image cache 140 and the application sharing host 110. Either the application sharing host 110 or the image cache 140, upon receipt of pushed imagery 120, can provide an update notification 170 to the application sharing viewers 180 to indicate that new imagery 120 has been uploaded to the cache. In response, the individual application sharing viewers 180, when permitted by the operation of the individual application sharing viewers 180, individually can post image requests 160 to the image cache 140 to retrieve the new imagery 120. Responsive to receiving the posted image requests 160 from individual ones of the application sharing viewers 180, the image cache 140 can serve cached imagery 150 to the individual ones of the application sharing viewers 180.

Importantly, the image cache 140 need not necessarily serve cached imagery 150 which corresponds to the image requests 160 provided by the individual ones of the application sharing viewers 180. Rather, the image cache can compare the state of the shared application in the application sharing host 110 by way of inspecting the available imagery 120 in the image cache 140 to the imagery 150 which already had been distributed to the individual ones of the application sharing viewers. When appropriate, particular frames representative of a past state of the shared application in the application sharing host 110 can be skipped in favor of subsequent frames. In this way, slower ones of the individual application sharing viewers 180 and late joiners among the application sharing viewers 180 can be accommodated without impacting the performance of application sharing among others of the application sharing viewers 180.

To further enhance the flexibility of the distribution of shared application imagery to varying types of application sharing viewers, the present invention can include a configuration for partitioning each image into a multiplicity of sub-sections. The partitioned image 190 can be stored within the image cache 140 and can be distributed to requesting ones of the application sharing viewers 180 on demand. In this regard, image metadata 130 can be associated with each separate sub-section of the partitioned image 190 so that each separate sub-section can be individually identified. When one of the application sharing viewers 180 requests an updated image 150, the cache 140 can serve only that portion of the requested image 150, stored as a partitioned image 190, which has changed since the last time the image had been distributed to the application sharing viewer 180.

It will be apparent to the skilled artisan that the novel and nonobvious arrangement illustrated in FIG. 1 lends itself to several advantages in the distribution of imagery during an application sharing session. First, system of the present invention will be recognized as highly scalable in that the burden for distribution of imagery rests with the image cache 140 which further can provide distributions, not directly to the individual application sharing viewers 180, but to a multipoint communications service which can mediate the image distribution task. More importantly, by implementing a pull-type architecture as between the individual application sharing viewers 180 and the image cache 140, images 150 are distributed only as requested by individual ones of the application sharing viewers 180. Accordingly, processing and timing deficiencies of the individual application sharing viewers 180 cannot inhibit the distribution of the images 150 to others of the application sharing viewers 180.

Figure 2:
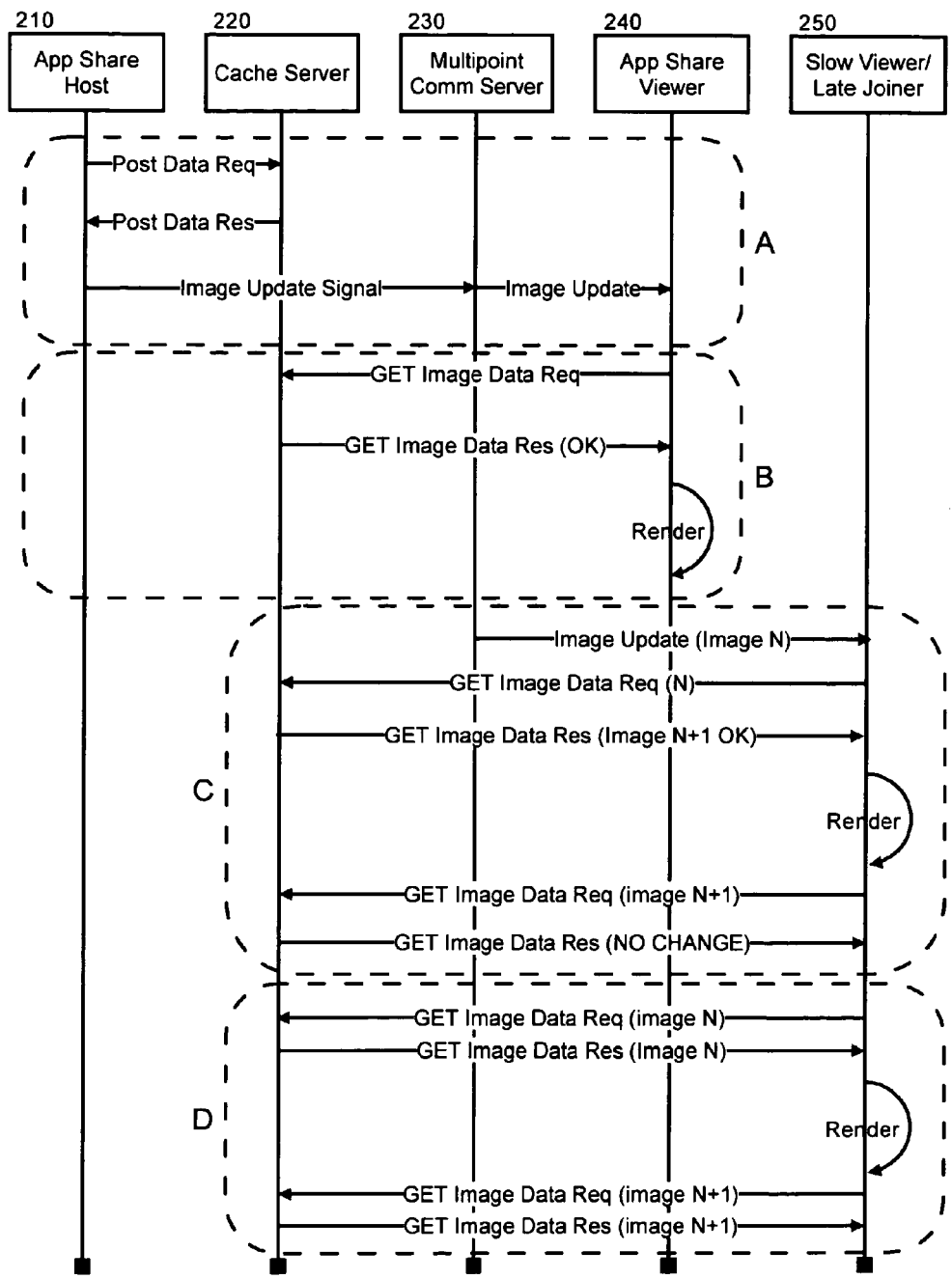

To further illustrate the inventive arrangements within the context of several different distribution scenarios during an application sharing session, FIG. 2 is a timing diagram illustrating a process for distributing application imagery during an application sharing session in accordance with the present invention. In accordance with a first scenario A in which a multipoint communications server 230 has been disposed intermediately to the cache server 220 and an application sharing viewer 240, the application sharing host 210 can post an updated image frame to the cache server 220 to which the cache server 220 can respond with an acknowledgment. Moreover, the cache server can also use the response to provide additional information to the application sharing host 210, such as the number of application sharing viewers 240 subscribing to updates from the cache server 220.

Once the cache server 220 has received an updated image frame for distribution to the application sharing viewers 240, an image update signal can be forwarded to the application sharing viewers 240 by way of the multipoint communications server 230. Notably, the image update signal can be initiated by either the application sharing host 210 or the cache server 220. In any event, once an application sharing viewer 240 receives an image update signal, the application sharing viewer 240, at its discretion can request an image update. Specifically, as shown in the second scenario B, the application sharing viewer 240 can forward a request to receive an image update from the cache server 220 which can respond with the requested image which the application sharing viewer 240 can render accordingly.

In the third illustrated scenario C, a slow or late joining application sharing viewer 250 can attempt to request an image which has become outdated in respect to other updated frames available in the cache server 220. In this regard, it can be presumed that the application sharing host 210 has produced shared application imagery at a faster rate than the imagery can be consumed by the slow application sharing viewer 250. In this case, the slow application sharing viewer 250 can receive an update signal for an Nth image of the shared application. In response, the slow application sharing viewer 250 can request the distribution of the Nth image.

Significantly, the cache server 220, recognizing the "slowness" of the slow application sharing viewer 250 can forward to the slow application sharing viewer 250 not the Nth image of the shared application, but the Nth+1 image which can be rendered in the application sharing viewer 250. When the slow application sharing viewer 250 subsequently receives an update signal indicating the availability of the Nth+1 image, the slow application sharing viewer 250 can request the Nth+1 image. The cache server 220, however, can respond only by indicating that the requested image already is available for viewing within the slow application sharing viewer 250. Accordingly, it is to be understood that the slow application sharing viewer 250 need not receive every image update, but only as many updates as possible.

Finally, in scenario D, a late joining application sharing viewer 250 can join an application sharing session in progress. To facilitate the late joining of the application sharing viewer 250, the late joining application sharing viewer 250 can obtain a pre-defined layout of the shared application so as to become familiarized with the images to be distributed in the course of application sharing. Using the pre-defined layout, the late joining application sharing viewer 250 can sequentially request the previously distributed images from the cache server 220, rendering each image before requesting the next. Alternatively, the late joining application sharing viewer 250 can acquire from the application sharing host 210 enough image metadata to identify those images which are to be fetched from the cache server 220.

From a review of the foregoing description of the preferred embodiments, the skilled artisan will recognize several departures from convention methods and systems for application sharing. First, late joiners to an application sharing session now can be accommodated gracefully without impinging upon the flow of application sharing with other application sharing viewers in the session. Second, images can be cached for retrieval by application sharing viewers. To the extent that a slow viewer cannot keep pace with other viewers, the slow viewer can skip some updated images. Finally, as the system of the invention can be characterized as a pull-system, the system can scale to accommodate a substantial number of viewers without impacting the performance of any one viewer.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for flexibly distributing imagery over a computer communications network comprising:
   an image sharing host comprising at least one computer with memory and at least one processor and communicatively coupled to a plurality of image sharing viewers over a computer communications network; and,
   an image cache disposed between the image sharing host and the plurality of image sharing viewers;
   the system being configured to generate an image frame update of a screen for a shared application being commonly viewed by the image sharing viewers, to cache in the image cache the image frame update for the screen for the shared application, to notify registered ones of the image sharing viewers of said image frame update for the screen for the shared application, and to serve from the image cache said cached image frame update for the screen for the shared application to requesting ones of said image sharing viewers that had been notified.

2. The system of claim 1, further comprising a multipoint communications server disposed between said image cache and said image sharing viewers and communicatively linked to said image sharing host.

3. The system of claim 1, further comprising a pull-based subscription model implemented in an image cache server hosting said image cache, said model having a configuration for registering respective ones of said image sharing viewers to receive notifications of available updated imagery.

4. The system of claim 1, wherein said image sharing host comprises an application sharing host.

5. The system of claim 3, wherein said updated imagery comprises updated imagery associated with a shared application hosted within said image sharing host.

6. A non-transitory machine readable storage device having stored thereon a computer program for flexibly distributing imagery for a shared application in an application sharing session, the computer program comprising a routine set of instructions which when executed by a machine cause the machine to perform the steps of:
   generating an image frame update of a screen for a shared application being commonly viewed by multiple different application sharing viewers;

caching the image frame update for the screen for the shared application;

notifying registered ones of the application sharing viewers of said image frame update for the screen for the shared application; and, serving said cached image frame update for the screen for the shared application to requesting ones of said application sharing viewers that had been notified.

7. The machine readable storage of claim 6, further comprising the steps of:

partitioning said cached image frame update into multiple sub-sections; and, caching said multiple sub-sections.

8. The machine readable storage of claim 7, wherein said serving step comprises the steps of:

comparing an already served image frame in said requesting ones of said application sharing viewers to said cached image frame update; and, serving only changed ones of said multiple sub-sections to said requesting ones of said application sharing viewers.

9. The machine readable storage of claim 6, wherein said serving step comprises the steps of:

detecting a slow one of said application sharing viewers; and, serving a newer image frame to said slow one of said application sharing viewers responsive to a request by said slow one of said application sharing viewers for an older image frame.

10. The machine readable storage of claim 6, further comprising the steps of:

detecting a late joining one of said application sharing viewers; and, serving a pre-defined layout of the shared application to said late joining one of said application sharing viewers in order to facilitate a sequential retrieval by said late joining one of said application sharing viewers of already distributed image frames for the shared application.

\* \* \* \* \*